United States Patent
Noda

(10) Patent No.: US 9,501,413 B2
(45) Date of Patent: Nov. 22, 2016

(54) STORAGE APPARATUS, STAGING CONTROL METHOD, AND COMPUTER-READABLE RECORDING MEDIUM HAVING STORED STAGING CONTROL PROGRAM

(71) Applicant: FUJITSU LIMITED, Kawasaki-shi, Kanagawa (JP)

(72) Inventor: Yuji Noda, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/492,101

(22) Filed: Sep. 22, 2014

(65) Prior Publication Data

US 2015/0095567 A1 Apr. 2, 2015

(30) Foreign Application Priority Data

Sep. 27, 2013 (JP) .................................. 2013-202312

(51) Int. Cl.
*G06F 12/08* (2016.01)
*G06F 3/08* (2006.01)
*G06F 3/06* (2006.01)

(52) U.S. Cl.
CPC ............. *G06F 12/0866* (2013.01); *G06F 3/06* (2013.01); *G06F 3/08* (2013.01); *G06F 12/0862* (2013.01)

(58) Field of Classification Search
CPC ...... G06F 12/0866; G06F 12/08; G06F 3/08; G06F 3/06; G06F 12/0804; G06F 2212/312; G06F 12/0862; G06F 3/061
See application file for complete search history.

(56) References Cited

U.S. PATENT DOCUMENTS

| 5,155,833 | A  | * | 10/1992 | Cullison | G06F 9/4405 711/113 |
| 5,640,600 | A  | * | 6/1997  | Satoh    | G06F 11/349 710/107 |
| 5,860,083 | A  | * | 1/1999  | Sukegawa | G06F 12/08 711/103 |
| 6,148,367 | A  | * | 11/2000 | Tsuboi   | G06F 12/0873 711/113 |
| 7,996,642 | B1 | * | 8/2011  | Smith    | G06F 12/0246 711/154 |
| 2004/0015641 | A1 | * | 1/2004 | Ishikawa | G06F 11/1076 711/1 |
| 2005/0138232 | A1 | * | 6/2005 | Tamura   | G06F 12/0808 710/22 |

(Continued)

FOREIGN PATENT DOCUMENTS

| JP | 10-154101 A   | 6/1998  |
| JP | 2008-310741 A | 12/2008 |
| JP | 2009-163647 A | 7/2009  |

*Primary Examiner* — Jared Rutz
*Assistant Examiner* — Jean Edouard
(74) *Attorney, Agent, or Firm* — Fujitsu Patent Center

(57) ABSTRACT

A cache controller controls data input/output of the storage device and causes the semiconductor storage device to function as a cache memory of the storage device. A staging controller performs, when data is staged from the storage device to the cache memory, first staging amount control until a staging amount to the cache memory exceeds a first threshold after the storage apparatus starts up; performs second staging amount control until a variation per unit time of a read amount from the cache memory falls within a predetermined range after the first period; and performs third staging amount control after the second period. With this configuration, the semiconductor apparatus can be efficiently used.

15 Claims, 11 Drawing Sheets

(56) References Cited

U.S. PATENT DOCUMENTS

| | | | | |
|---|---|---|---|---|
| 2005/0177680 A1* | 8/2005 | Miura | G06F 12/0866 | 711/112 |
| 2005/0228962 A1* | 10/2005 | Takase | G06F 12/0246 | 711/168 |
| 2009/0077302 A1* | 3/2009 | Fukuda | G06F 12/0868 | 711/103 |
| 2009/0106583 A1* | 4/2009 | Kawamura | G06F 11/1076 | 714/6.13 |
| 2010/0017556 A1* | 1/2010 | Chin | G06F 12/0246 | 711/103 |
| 2010/0070712 A1* | 3/2010 | Arimilli | G06F 12/127 | 711/122 |
| 2010/0125704 A1* | 5/2010 | Kanai | G06F 12/0804 | 711/113 |
| 2010/0191918 A1* | 7/2010 | Lee | G06F 12/0862 | 711/137 |
| 2010/0205384 A1* | 8/2010 | Beaumont-Smith | G06F 12/0862 | 711/154 |
| 2011/0082967 A1* | 4/2011 | Deshkar | G06F 12/0246 | 711/103 |
| 2011/0296085 A1* | 12/2011 | Eleftheriou | G06F 12/0246 | 711/103 |
| 2012/0011326 A1* | 1/2012 | Higashijima | G06F 12/0804 | 711/142 |
| 2012/0221813 A1* | 8/2012 | Inoue | G06F 11/2064 | 711/162 |
| 2013/0036260 A1* | 2/2013 | Kurashige | G06F 12/0868 | 711/103 |
| 2013/0086307 A1* | 4/2013 | Kurashige | G06F 12/0866 | 711/103 |
| 2013/0151780 A1* | 6/2013 | Daly | G06F 12/0897 | 711/122 |
| 2014/0115235 A1* | 4/2014 | Ito | G06F 12/0868 | 711/103 |
| 2014/0143504 A1* | 5/2014 | Beveridge | G06F 12/0815 | 711/143 |
| 2014/0351521 A1* | 11/2014 | Kudo | G06F 12/0868 | 711/125 |

* cited by examiner

| | CACHE USAGE RATE | HIT AMOUNT (READ AMOUNT) | WRITE REQUEST AMOUNT | ACTUAL WRITE AMOUNT |
|---|---|---|---|---|
| 0 day 1 HOUR | 10 % | 10 MB | 234,567 MB | 123,678 MB |
| 0 day 2 HOURS | 11 % | 8 MB | 124,555 MB | 112,347 MB |
| ... | | | | |
| 9 days 23 HOURS | 55 % | 22 MB | 100,736 MB | 89,373 MB |
| 9 days 24 HOURS | 56 % | 26 MB | 112,476 MB | 90,373 MB |

FIG. 7

| | CACHE USAGE RATE | HIT AMOUNT (Read AMOUNT) | WRITE REQUEST AMOUNT | ACTUAL WRITE AMOUNT |
|---|---|---|---|---|
| LAST 10 days | 30 % | 68 GB | 34,567 GB | 21,678 GB |
| 20 day | 22 % | 54 GB | 30,555 GB | 19,347 GB |
| ... | | | | |
| 90 day | 18 % | 48 GB | 38,736 GB | 19,373 GB |
| 100 day | 10 % | 39 GB | 39,476 GB | 18,373 GB |

T3

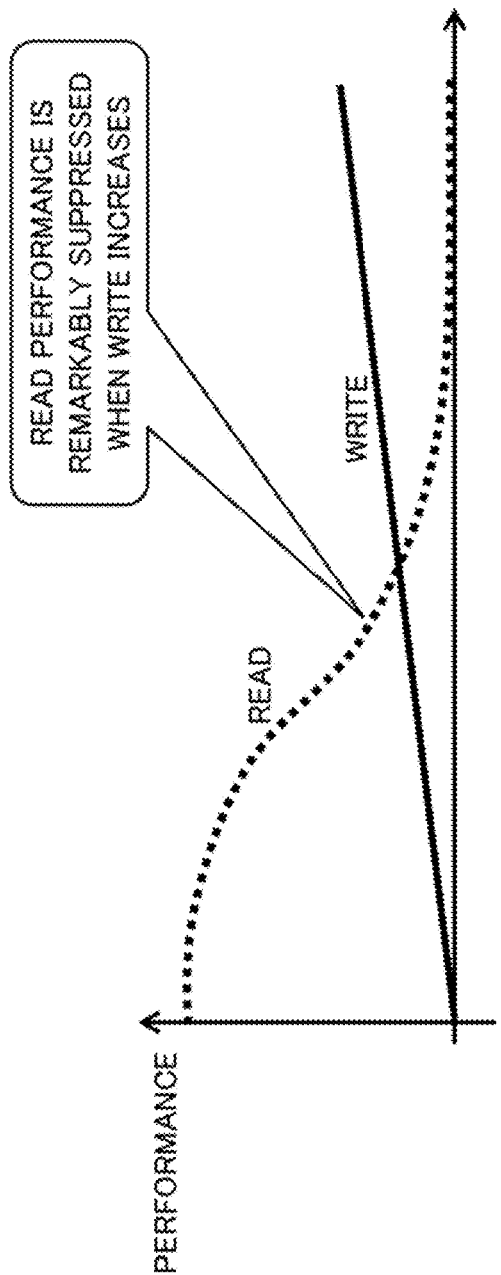

STORAGE APPARATUS, STAGING CONTROL METHOD, AND COMPUTER-READABLE RECORDING MEDIUM HAVING STORED STAGING CONTROL PROGRAM

CROSS-REFERENCE TO RELATED APPLICATION

This application is based upon and claims the benefit of priority of the prior Japanese Patent application No. 2013-202312, filed on Sep. 27, 2013, the entire contents of which are incorporated herein by reference.

FIELD

The embodiments discussed herein are directed to a storage apparatus, a staging control method, and a computer-readable medium having stored a staging control program.

BACKGROUND

In recent years, a solid state drive (SSD) which employs a flash memory in a recording medium has been developed to reduce the cost, enlarge the capacity, and enhance the capacity. Accordingly, a storage apparatus dedicated to enterprises is enhanced in capacity by employing the SSD as a data cache in addition to general volatile memories such as a dynamic random access memory (DRAM) and a double data rate synchronous DRAM (DDR SDRAM).

Herein, the SSD has the following characteristics compared to the general volatile memory (hereinafter, referred to as DRAM/DDR) described above.

(1) Having a large capacity, and usable as a low-cost nonvolatile memory (2) Having limits on a total amount of data in write In other words, the SSD is limited in its life, a so-called life span. In addition, the life span of the SSD varies depending on the type of flash memory which is mounted in the SSD (a single level cell (SLC), a multi level cell (MLC)) and a mounting amount.

(3) Having an access performance lower than that of the DRAM/DDR

In general, the DRAM/DDR having a high access performance is used as a primary cache, and the SSD is used as a secondary cache.

CITATION LIST

Patent Literatures

Patent Literature 1: Japanese Laid-open Patent Publication No. 10-154101 A

Patent Literature 2: Japanese Laid-open Patent Publication No. 2008-310741 A

Patent Literature 3: Japanese Laid-open Patent Publication No. 2009-163647 A

However, in such a storage apparatus in the related art, when the SSD is used as a secondary cache of the storage apparatus, there is a problem as follows.

In other words, as described above, the SSD is limited in its life span, and when staging is frequently performed, the life span is shortened. In addition, the staging means to write data read out of the storage device such as a hard disk drive (HDD) to the secondary cache (SSD).

Further, the SSD has an upper limit in total performances in read/write, and when the staging (write) of a large amount of data is performed on the SSD at a time, a read performance becomes low in proportion to the staging.

FIG. 11 is a diagram illustrating a relation between a write amount and a read performance in the SSD. As illustrated in FIG. 11, when a write amount increases (see the right portion in the drawing), the SSD is remarkably degraded in its read performance. This is because the SSD has a large load on the write compared to the read.

SUMMARY

According to an embodiment, there is provided a storage apparatus which includes a storage device and a semiconductor storage device. The storage apparatus includes a cache controller that controls data input/output of the storage device and causes the semiconductor storage device to function as a cache memory of the storage device, and a staging controller that performs, when data is staged from the storage device to the cache memory, first staging amount control until a staging amount to the cache memory exceeds a first threshold after the storage apparatus starts up; performs second staging amount control until a variation per unit time of a read amount from the cache memory falls within a predetermined range after the first period; and performs third staging amount control after the second period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a long cycle table in the storage apparatus according to the embodiment;

FIG. 11 is a diagram illustrating a relation between a write amount and a read performance in the SSD.

DESCRIPTION OF EMBODIMENT(S)

Figure 1:
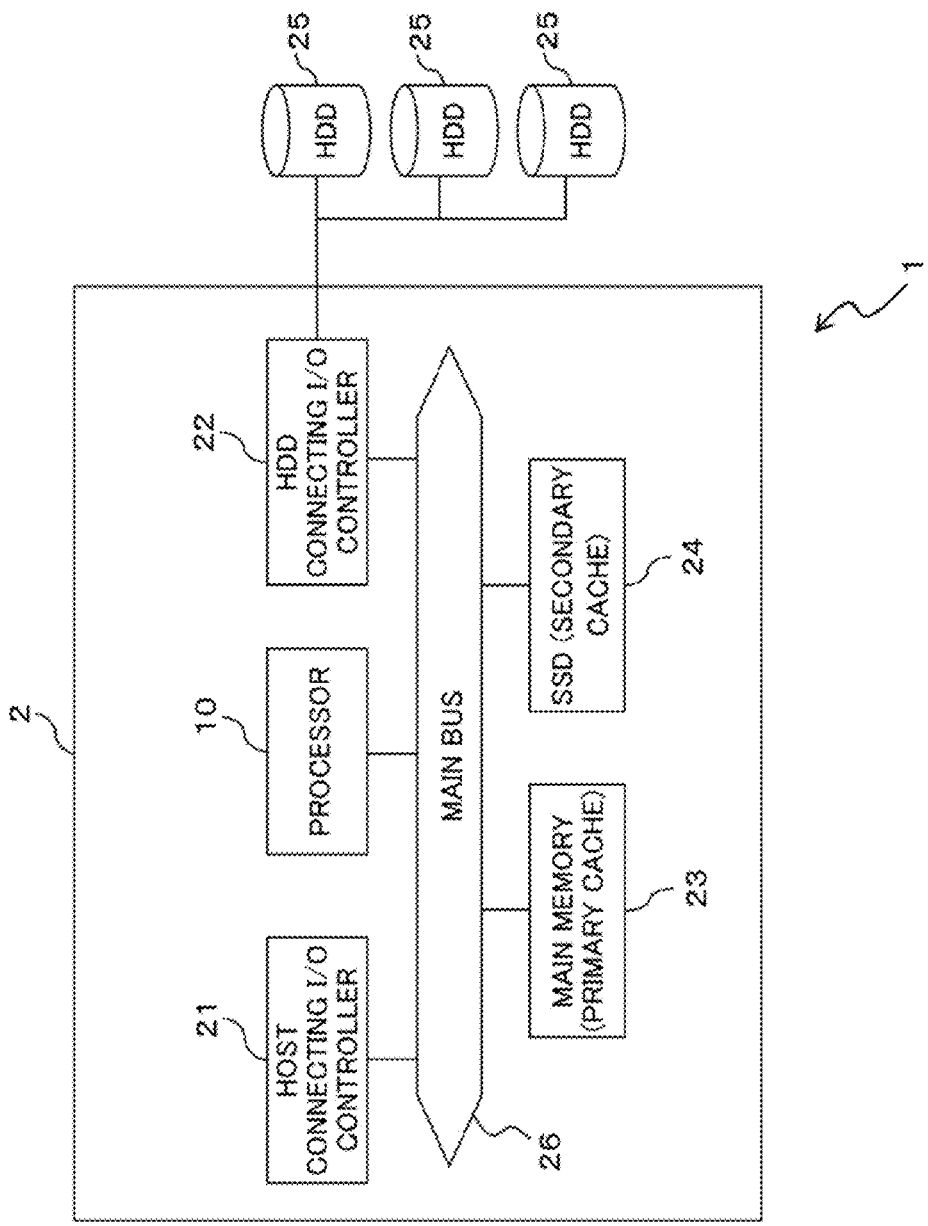
FIG. 1 is a diagram illustrating a hardware configuration of a controller of a storage apparatus according to an embodiment.

Hereinafter, embodiments of a storage apparatus, a staging control method, and a computer-readable recording medium having stored a staging control program will be described with reference to the drawings. However, the following embodiments are given as merely exemplary, and it is not intended to exclude various modifications and various technical applications which are not specified in the embodiments. In other words, the embodiments can be implemented in various forms within a scope not departing from the spirit thereof. Further, there is no purpose of exclusively including only the components in the drawings, but other functions can be included.

Figure 2:
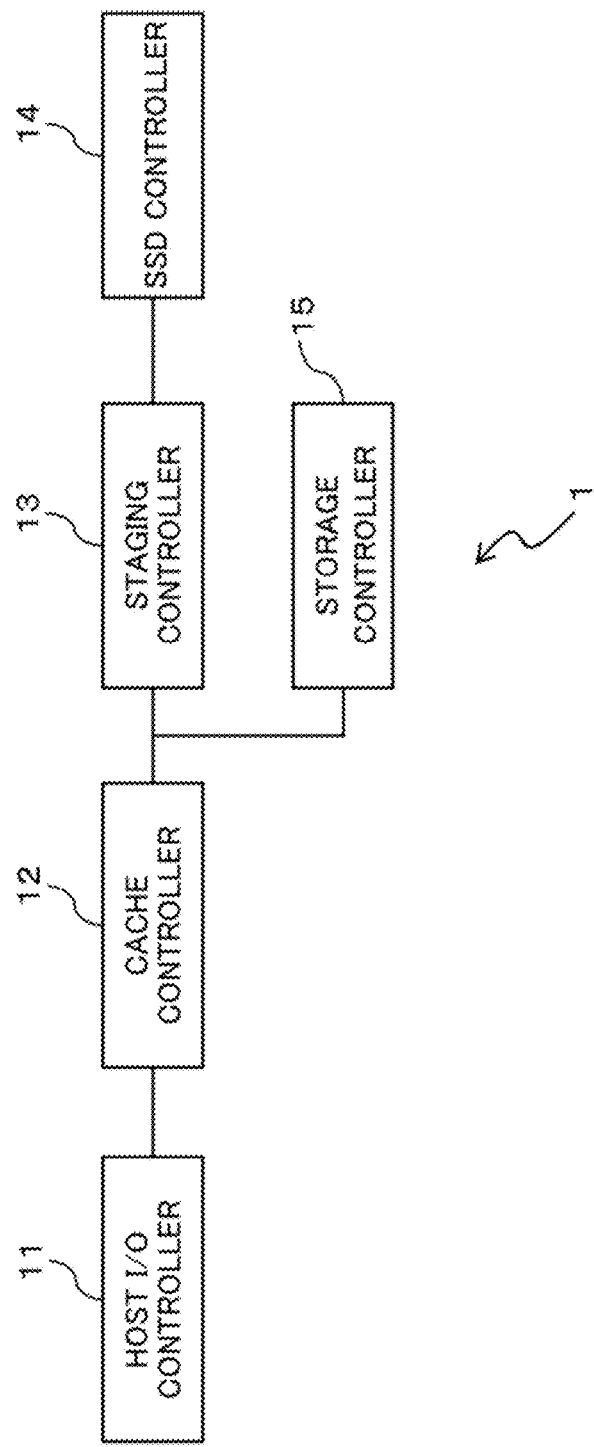
FIG. 2 is a diagram illustrating a functional configuration of the controller of the storage apparatus according to the embodiment.

FIG. 1 is a diagram illustrating a hardware configuration of a controller of a storage apparatus 1 according to an embodiment, and FIG. 2 is a diagram illustrating a functional configuration thereof.

Figure 3:
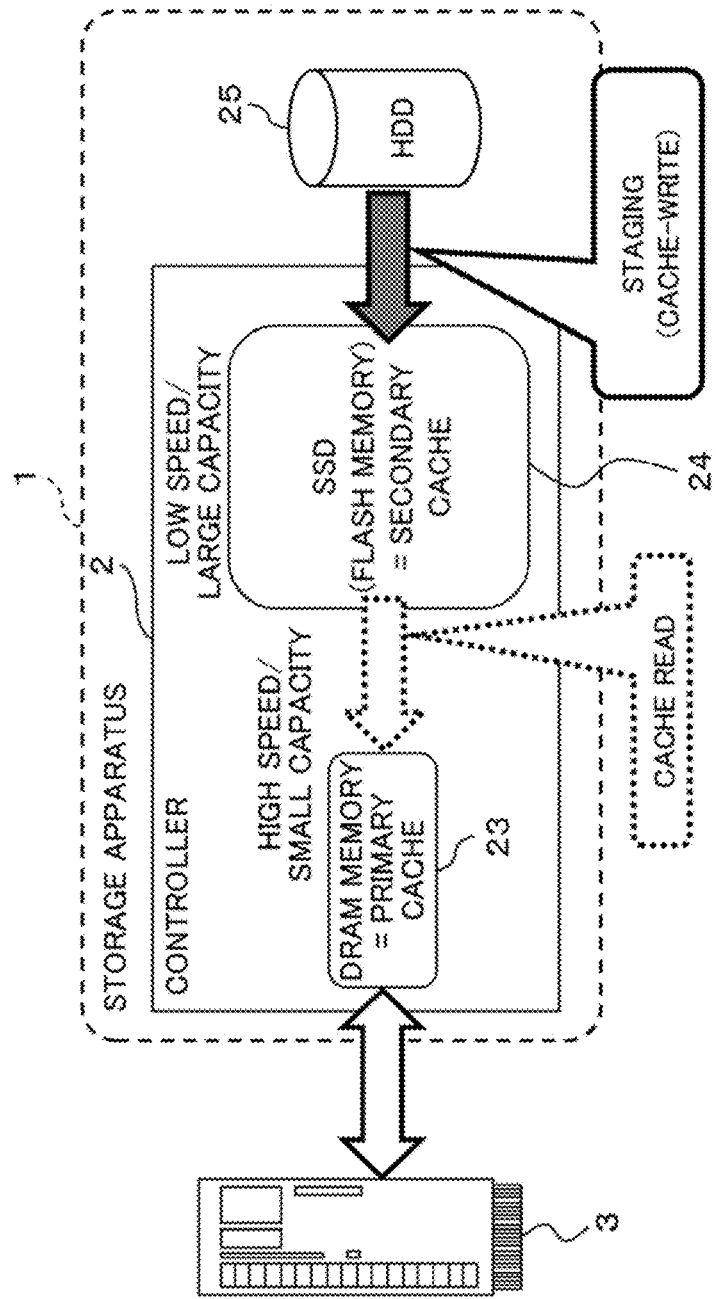
FIG. 3 is a diagram illustrating a relation between a primary cache and a secondary cache in the storage apparatus according to the embodiment.

The storage apparatus 1 includes one or more (three in the example illustrated in FIG. 1) hard disk drives (HDDs) 25, and provides a storage area to a host apparatus 3 (see FIG. 3).

As illustrated in FIG. 1, the storage apparatus 1 includes a plurality of HDDs 25 and a controller 2.

The controller 2 serves to perform various types of control in the storage apparatus 1, and performs various types of control such as access control to the HDDs 25 according to a storage access request (access control signal: host I/O) from the host apparatus 3. The controller 2, for example, may be called a controller module (CM). In addition, the storage apparatus 1 may include two or more controllers 2.

The controller 2 is connected to a network (not illustrated) through a host connecting I/O controller 21, receives a command such as read/write from the host apparatus 3, and performs control on a disk through an HDD connecting I/O controller 22.

As illustrated in FIG. 2, the controller 2 includes the host connecting I/O controller 21, a processor 10, the HDD connecting I/O controller 22, a main memory 23, and an SSD 24. Further, in the controller 2, the host connecting I/O controller 21, the processor 10, the HDD connecting I/O controller 22, the main memory 23, and the SSD 24 are communicably connected to each other through a main bus 26.

The HDD 25 is a storage device which stores various types of data and programs. Two or less HDDs 25 may be provided, or four or more HDDs 25 may be provided. Further, redundant arrays of inexpensive disks (RAID) may be formed using the plurality of HDDs 25.

The host connecting I/O controller 21 is a communication adapter which is connected to the host apparatus 3 through a local area network (LAN) or a communication line such as an optical line, and transmits/receives various commands and data with respect to the host apparatus 3. An I/O command such as a read command and a write command and various types of data, which are transmitted from the host apparatus 3, are received by the host connecting I/O controller 21. Further, the data and the like read out of the HDDs 25 are transmitted to the host apparatus 3 through the host connecting I/O controller 21.

As the host connecting I/O controller 21, various interfaces, for example, a LAN interface, a channel adapter (CA), and the like can be used according to an interface standard between the storage apparatus 1 and the host apparatus 3.

The HDD connecting I/O controller 22 is a storage interface which is communicably connected to the respective HDDs 25 and transmits/receives various command and data with respect to these HDDs 25. The HDD connecting I/O controller 22, for example, may be called a device adapter (DA).

As the HDD connecting I/O controller 22, various interfaces, for example, a small computer system interface (SCSI), iSCSI, a fibre channel (FC), and the like can be used according to an interface standard between the storage apparatus 1 and the HDD 25.

The main memory 23 is a main storage device which is used as a working memory when the processor 10 performs various processes, and used as a primary cache of the storage apparatus 1. As the main memory 23, a typical volatile memory, for example, a DRAM, a DDR SDRAM, and the like is used.

The SSD 24 is a semiconductor storage device which employs a semiconductor memory element in a recording medium, and used as the secondary cache of the storage apparatus 1. The SSD 24 has an access performance lower than that of the main memory 23 (low speed), and has a capacity larger than that of the main memory 23.

FIG. 3 is a diagram illustrating a relation between the primary cache and the secondary cache in the storage apparatus 1 according to the embodiment.

As illustrated in FIG. 3, data read out of the HDD 25 is stored (staged) in the SSD 24 which is the secondary cache. Further, the data stored in the SSD 24 is read out (cache-read), and stored in the main memory 23 which is the primary cache.

When a read request is issued from the host apparatus 3, in a case where read target data is stored in the main memory 23 (cache-hit), the controller 2 replies to the host apparatus 3 with the data read out of the main memory 23. In a case where the read target data is not stored in the main memory 23 (cache-miss), the controller 2 determines whether the read target data is stored in the SSD 24.

In a case where the read target data is stored in the SSD 24 (cache-hit), the controller 2 stores the data read out of the SSD 24 in the main memory 23 and then replies to the host apparatus 3. On the other hand, in a case where the read target data is not stored even in the SSD 24 (cache-miss), the controller 2 reads the read target data out of the HDD 25 and stages the data to the SSD 24, cache-reads the data to the main memory 23, and then replies to the host apparatus 3.

The processor 10 is a processing apparatus (computer) which performs various types of control and calculations, and realizes various functions by executing OSs and programs (device drivers) stored in a read only memory (ROM) (not illustrated) or the HDD 25. In addition, these OSs and programs may be stored in the SSD 24.

In other words, as illustrated in FIG. 2, the processor 10 functions as a host I/O controller 11, a cache controller 12, a staging controller 13, an SSD controller 14, and a storage controller 15.

In addition, for example, the program (device driver and staging control program) for realizing the functions as the host I/O controller 11, the cache controller 12, the staging controller 13, the SSD controller 14, and the storage controller 15 are provided in a form of being recorded in a recording medium (not illustrated). Then, the processor (computer) 10 reads the program out of the recording medium and transfers the program to an internal storage device or an external storage device for storage and usage. Further, the program may be kept in a storage device (recording medium), for example, a magnet disk, an optical disk, a magneto-optical disk, and the like, and provided to the processor 10 from the storage device through a communication path.

When the functions as the host I/O controller 11, the cache controller 12, the staging controller 13, the SSD controller 14, and the storage controller 15 are realized, the program stored in the internal storage device (the main memory 23 and the like in the embodiment) is executed by the processor 10. At this time, the program stored in the recoding medium may be read out by the processor 10 for execution.

The host I/O controller 11 controls communication with the host apparatus 3. The host I/O controller 11 transmits/receives the I/O command and various types of data with respect to the host apparatus 3 through the above-mentioned host connecting I/O controller 21.

The storage controller 15 performs hardware control of the HDD 25. In other words, the storage controller 15 performs control of reading or writing data with respect to the HDD 25. For example, the storage controller 15 receives the read request for the data from the cache controller 12, and reads the designated data out of the HDD 25.

The SSD controller 14 performs hardware control of the SSD 24. In other words, the SSD controller 14 performs control of reading or writing data with respect to the SSD 24. For example, the SSD controller 14 writes the data to the SSD 24 according to the control of the staging controller 13 to be described below.

Specifically, the SSD controller 14 performs staging on the SSD 24 according to a staging amount obtained by the staging controller 13 as to be described below. In a case where the staging is performed, the storage controller 15 reads the data out of the HDD 25, and the SSD controller 14 writes the data in the SSD 24.

The functions as the SSD controller 14 and the storage controller 15, for example, are realized by disk drivers.

The cache controller 12 performs cache control using the main memory 23 and the SSD 24.

For example, in a case where the data corresponding to the read request from the host apparatus 3 is not stored in the SSD 24, the cache controller 12 causes the storage controller 15 to read the target data out of the HDD 25. Then, the cache controller 12 causes the SSD controller 14 to stage the data read out of the HDD 25 to the SSD 24.

Further, in a case where the data corresponding to the read request from the host apparatus 3 is not stored in the main memory 23, the cache controller 12 causes the SSD controller 14 to cache-read the target data from the SSD 24, and also performs control of storing the data in the main memory 23.

The function as the cache controller 12, for example, is realized by a cache driver.

The staging controller 13 limits (controls) a write amount in staging performed by the SSD controller 14. Specifically, the staging controller 13 learns and predicts a usage condition of the SSD (secondary cache) 24, and determines an optical staging amount. Then, a cache access (staging and read) performed by the SSD controller 14 is controlled based on the determined staging amount.

Herein, the SSD 24 used as the secondary cache of the storage apparatus 1, for example, has a relative large capacity of about several TB, and thus it takes time until the operation becomes stable. A read amount and a staging amount in the SSD 24 each show unique transitions until the SSD 24 reaches the stable operation state after the storage apparatus 1 starts up.

Figure 4:
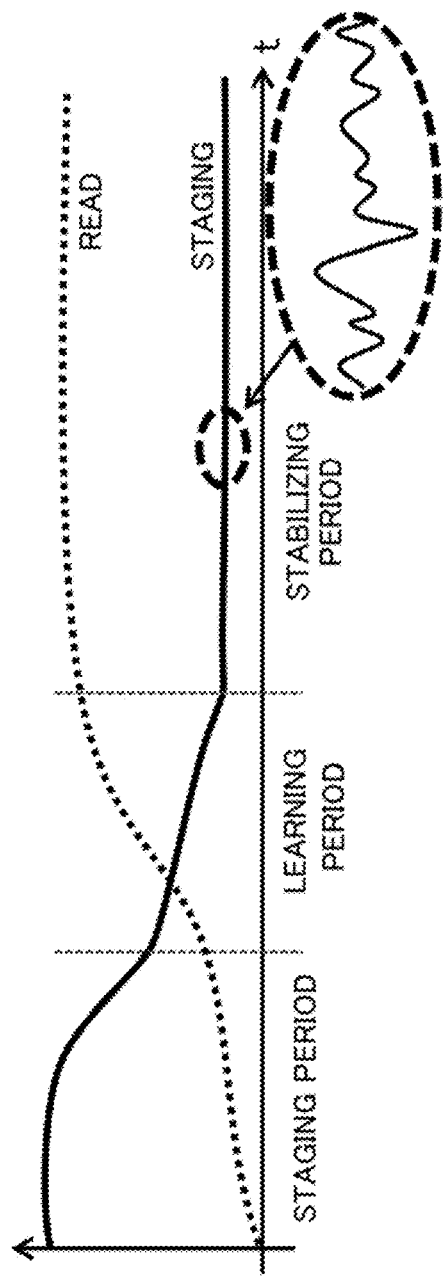
FIG. 4 is a diagram illustrating a time transition of a read amount and a staging amount of an SSD in the storage apparatus according to the embodiment.

FIG. 4 is a diagram illustrating a time transition of the read amount and the staging amount of the SSD 24 in the storage apparatus 1 according to the embodiment. FIG. 4 illustrates variations in the read amount and the write amount with respect to the SSD 24 as time goes on after the storage apparatus 1 starts up. As illustrated in FIG. 4, it can be seen that the staging amount in the SSD 24 is reduced as time goes on, and on the other hand the read amount is increased as time goes on.

Hereinafter, the use period of the SSD 24 will be considered using three divided periods, a staging period (first period), a learning period (second period), and a stabilizing period (third period).

After the storage apparatus 1 starts up, a period until the staging amount (write amount) to the SSD 24 exceeds a predetermined first threshold will be referred to as the staging period (first period).

Further, after the staging period, a period until a variation per unit time in the read amount from the SSD 24 falls within a predetermined range will be referred to as the learning period (second period). Furthermore, a period after the learning period will be referred to as the stabilizing period (third period).

As illustrated in FIG. 4, in the staging period, the staging amount is large, and on the other hand a cache hit amount in the SSD 24, that is, the read amount is small (very little). Further, in the learning period, the staging amount is reduced, and on the other hand the cache hit (read) amount in the SSD 24 is increased. Furthermore, in the stabilizing period, the staging amount is stabilized in a small-amount state, and on the other hand the cache hit (read) amount is stabilized in a large-amount state. In addition, the staging amount varies when it is viewed in detail (see a circle depicted with a broken line in FIG. 4).

The staging controller 13 has a function of detecting a switching to each period between the staging period, the learning period, and the stabilizing period. In other words, until detecting that the staging amount (write amount) to the SSD 24 exceeds the predetermined first threshold after the storage apparatus 1 starts up, the staging controller 13 recognizes that period as the staging period.

Further, after the detection of the staging amount (write amount) to the SSD 24 exceeding the predetermined first threshold, it is recognized as the learning period. Thereafter, when detecting that a variation per unit time of the read amount from the SSD 24 falls stably within a predetermined range, it is recognized as the stabilizing period.

In addition, when detecting a switching between these periods, the staging controller 13, for example, desirably sets a flag in a predetermined area in the main memory 23 to indicate which period is now.

Further, the staging controller 13 has a function of creating an SSD performance characteristic table T1, and has a function of creating a process history in the SSD 24 as a short cycle table T2 and a long cycle table T3.

In the following, a method of creating the respective tables by the staging controller 13 will be described.

(1) SSD Performance Characteristic Table T1

The staging controller 13, for example, measures performance characteristics at the time of competition in read/write of the SSD 24 when the storage apparatus 1 starts up, and creates the SSD performance characteristic table T1 based on the measured result.

Figure 5:
FIG. 5 is a diagram illustrating an SSD performance characteristic table in the storage apparatus according to the embodiment.

FIG. 5 is a diagram illustrating the SSD performance characteristic table T1 in the storage apparatus 1 according to the embodiment.

The SSD performance characteristic table T1 is performance characteristic information which indicates a combination of write (write performance) and the load of read (read load) when the SSD 24 is in a performance limit (performance saturation) state. In the example illustrated in FIG. 5, the table is configured with a combination of the write amount and the read amount.

The write amount is a value indicating a write load amount. In a case where a maximum processing performance value (e.g., the number of commands or the amount of data) in write is assumed to be 100%, the write amount is represented as a ratio (unit: %) of a processing performance when the SSD 24 performs only a write process to the maximum processing performance. In addition, the maximum processing performance in write, for example, can be determined by detecting that an increase of the process amount remains at its maximum even when a write load is imposed further more.

In the example illustrated in FIG. 5, 9-stage load amounts of 10%, 20%, 30%, ..., 80%, and 90% are registered as the write amount in the SSD performance characteristic table T1.

In addition, the write amounts in the SSD performance characteristic table T1 are not limited to these 9 stages, 8 stages or less write amounts or 10 stages or more write amounts may be registered. Further, it is a matter of course that various modifications can be implemented.

The read amount is a data amount (e.g., unit: MB) which can be written in the SSD 24 per unit time (e.g., every 1 second), and indicates a data amount which can be read in a state where a write load represented by the above write amount is applied on the SSD 24. Then, the SSD performance characteristic table T1 contains the read load and the write performance in association with each other.

In other words, a combination of the write amount and the read amount registered in the SSD performance characteristic table T1 shows that the SSD 24 comes into a performance limit state and a processing capability comes into a saturated state when a read process of the read amount is performed in a state where the write process of the write amount is performed. For example, when a read process of 200 MB per second is performed in a state where 10% load of the maximum processing performance in write is applied on the SSD 24, the performance of the SSD 24 comes into a saturated state (performance limit).

In other words, referring to the SSD performance characteristic table T1, it can be known that how much read amount is added to each write load to make the SSD 24 come into the performance limit state.

The SSD performance characteristic table T1, for example, can be created according to the following sequences (a1) and (a2).

(a1) While measuring the load condition of the SSD 24, a plurality of write requests are issued to the SSD 24 until the processing performance thereof is saturated, and then a maximum performance in write is specified. In other words, an issued amount of the write requests when the load condition of the SSD 24 reaches its maximum is obtained. The specified maximum write performance value is stored in a storage area such as the main memory 23. In addition, the load of the SSD 24 can be realized using various given methods, and the descriptions thereof will not be made for the convenience.

(a2) When it is assumed that the obtained maximum performance value in write is 100%, a range from 0% to 100% is divided into a plurality of stages, an upper limit value of the read load at which an increase of a read performance reaches its maximum is obtained for each value indicating the write performance at each stage, and the upper limit is registered in the SSD performance characteristic table T1.

FIG. 5 illustrates an example in which the write amount is divided into 9 stages of 10%, 20%, 30%, 40%, 50%, 60%, 70%, 80%, and 90% at a pitch of 10%.

First, the staging controller 13, for example, issues a plurality of write requests to set the maximum write performance value to a write load of 10%. Then, in this state, the staging controller 13 causes the SSD controller 14 to increase the read load while measuring the load condition of the SSD 24.

The staging controller 13 determines a read amount (saturated read amount; 200 MB in the example illustrated in FIG. 5) at the time when the read performance reaches its maximum, and registers the saturated read amount in the SSD performance characteristic table T1 in association with the corresponding write amount. The staging controller 13 performs the same process on each of the other write amounts in the SSD performance characteristic table T1, determines each saturated read amount in each write load, and registers the saturated read amount in the SSD performance characteristic table T1, thereby completing the SSD performance characteristic table T1.

(2) Short Cycle Table T2 and Long Cycle Table T3

The staging controller 13 creates the short cycle table T2 and the long cycle table T3 at every read access or write access with respect to the SSD 24 based on the process record (record information).

Herein, the short cycle table T2 is process history information of the SSD 24, which is obtained by adding up the records of the read and write accesses with respect to the SSD 24 in a short cycle (e.g., 1-hour interval). Further, the long cycle table T3 is process history information of the SSD 24, which is obtained by adding up the records of the read and write accesses with respect to the SSD 24 in a long cycle (e.g., 10-day interval) longer than the short cycle.

Figure 6:
FIG. 6 is a diagram illustrating a short cycle table in the storage apparatus according to the embodiment.

FIG. 6 is a diagram illustrating the short cycle table T2 in the storage apparatus 1 according to the embodiment, and FIG. 7 is a diagram illustrating the long cycle table T3.

In the short cycle table T2 and the long cycle table T3, a cache usage rate and a hit amount (read amount) are stored as the record information of the read access. Further, a write request amount and an actual write amount are stored as the record information of the write access.

A cache usage amount indicates a cache data amount which is stored in the SSD 24. In the examples illustrated in FIGS. 6 and 7, as the cache usage amount, a ratio of the data size of the stored cache data to the capacity of the SSD 24 is represented as a percentage value.

The hit amount is a data amount (read amount, cache hit amount) which is able to be replied (read, cache-hit) by the SSD 24 to a read request.

The write request amount is a data amount for which the write request is issued to the SSD 24, and the actual write amount is a data amount which is actually written to the SSD 24.

Each information item of the cache usage rate, the hit amount, the write request amount, and the actual write amount may be acquired by a given method. For example, the information is managed by the above-mentioned cache controller 12.

In the short cycle table T2, the information is collected in every predetermined period (e.g., 1-hour interval) for registration. In addition, in the example illustrated in FIG. 6, entries are arranged and registered in time series. In the drawing, the upper entry represents an old information item, and the lowest entry represents the last (newest) collected result. Further, in the example illustrated in FIG. 6, the 10-day record information is registered in a unit of 1 hour.

For example, the example illustrated in FIG. 6 shows that the cache data is stored in 56% storage area of the SSD 24 on average for the last 1 hour, and total 26 MB data is read from the SSD 24 in response. Furthermore, for the last 1 hour, the write request for 112,476 MB data is performed on the SSD 24, and 90,373 MB of the data is actually stored in the SSD 24.

In the long cycle table T3, the respective information items of the cache usage rate, the hit amount, the write request amount, and the actual write amount are collected in every predetermined period (e.g., 10 days) longer than the short period for registration. For example, the respective data items in the long cycle table T3 may be calculated by integrating the respective data items registered in the long cycle table T3.

In addition, in the example illustrated in FIG. 7, the upper entry represents an old information item, and the lowest entry represents the last (newest) collected result for 10 days. Further, in the example illustrated in FIG. 7, the 100-day record information is registered in a unit of 10 days.

For example, the example illustrated in FIG. 7 shows that the cache data is stored in 30% storage area of the SSD 24 on average for the last 10 days, and the integrated 68 GB data is read from the SSD 24 in response. Furthermore, for the last 10 days, the write request for the integrated 34,567 GB data is performed on the SSD 24, and 21,678 GB of the data is actually stored in the SSD 24.

In addition, the SSD performance characteristic table T1, and the short cycle table T2, and the long cycle table T3 are stored in a predetermined area in the main memory 23 or the like.

Further, the staging controller 13 determines a staging amount optimized for the SSD 24 in each of the staging period, the learning period, and the stabilizing period.

(A) Staging Period

In the staging period, a cache hit by the read request does not probably occur, and the limit on the staging amount is not made in the staging period in order to quickly transition the state of the SSD 24 to the stabilizing period. In the staging period, the staging controller 13 performs the staging by priority (first staging amount control).

In other words, in the first staging amount control, the staging controller 13 performs control of staging all the data read out of the HDD 25 to the SSD 24 according to an instruction from the cache controller 12, and does not suppress the staging amount to the SSD 24. The reading is performed between the staging operations as time allows.

(B) Learning Period

Even in the learning period, the staging is performed by priority similarly in the staging period. In this case, the possibility of the reading is also predicted based on the last hit rate, and the limit on the staging amount is made at a minimum.

In the learning period, since the data amount in the SSD 24 varies in a short term, the hit amount (cache hit amount) in the last 1 hour and the hit amount in the last 2 hours are read out with reference to the short cycle table T2. Then, an increase tendency is obtained according to these hit amounts, and a hit amount in the subsequent 1 hour is predicted (hit amount prediction) based on the increase tendency.

The staging controller 13, for example, calculates a predicted hit amount based on the following Equation (1).

$$\text{Predicted hit amount} = \{(\text{Hit amount in the last 1 hour}) - (\text{Hit amount in the last 2 hours})\} + (\text{Hit amount in the last 1 hour}) \quad (1)$$

The staging controller 13 determines the write amount corresponding to the hit amount based on the predicted hit amount thus calculated with reference to the SSD performance characteristic table T1.

For example, in the short cycle table T2 illustrated in FIG. 6, since the hit amount in the last 1 hour is 26 MB and the hit amount in the last 2 hours is 22 MB, the predicted hit amount is obtained by Equation (1) as (26−22)+26=30 MB.

In addition, the prediction of the hit amount by the staging controller 13 is not limited by Equation (1), and can be performed in various other modified ways. For example, the increase tendency may be obtained using the last 3 or more hit amounts.

The staging controller 13 determines a write amount of 60% based on a predicted hit amount of 30 MB with reference to the SSD performance characteristic table T1 illustrated in FIG. 5. The 60% write amount is a value which allows the SSD 24 to exert its performance at a maximum without any influence on the 30 MB read amount. In other words, when the writing is performed on the SSD 24 with 60% write load of the maximum performance in a state where the 30 MB predicted hit amount is read out of the SSD 24, the SSD 24 can be utilized at its best performance.

In addition, in a case where there is no same value as the predicted hit amount thus calculated in the SSD performance characteristic table T1, it is desirable that a value approximated to the predicted hit amount in the SSD performance characteristic table T1 be used, but not limited thereto. Alternatively, the predicted hit amount value may be carried up or off, or rounded off to the nearest integer in order to determine the corresponding value in the SSD performance characteristic table T1, and may be obtained by various other modified ways.

The staging controller 13 limits the staging performed by the SSD controller 14 based on the determined write amount.

Specifically, the staging controller 13 limits the load of the write amount such that the load amount of the SSD 24 is set to a value obtained by multiplying the value of the maximum processing performance in write of the SSD 24 described above by the determined write amount.

For example, in a case where the determined write amount is 60%, the staging controller 13 limits the write amount such that the load of the SSD 24 reaches 60% of the maximum performance of the SSD 24.

In this way, in the learning period, the staging controller 13 realizes the staging control (second staging amount control) by determining the staging amount which allows the SSD 24 to exert its performance at a maximum without any influence on the read performance.

Therefore, in a state where the SSD 24 is operated by the predicted hit amount (read amount), the SSD 24 can be operated by the write amount which allows the SSD 24 to exert its performance at a maximum. In other words, it is possible to efficiently operate the SSD 24.

(C) Stabilizing Period

In the stabilizing period, the read (read hit) process has been performed by priority, and the staging is performed under third staging amount control in which the lowest amount is set to use the SSD 24 to the end of its life span.

The staging controller 13 calculates a threshold (reference threshold) to use the SSD 24 to the end of its life span based on the following Equation (2).

$$\text{Threshold} = (\text{SSD writable amount} - \text{Written amount}) / (\text{Remaining usable years} \times 365 \times 24 - \text{SSD operated period}) / (60 \text{ minutes} \times 60 \text{ seconds/unit second}) \quad (2)$$

Herein, the SSD writable amount is a total data amount which is allowed for the SSD 24 to be written (total writable amount), that is, a total amount of data (life performance information) which can be written until the life span (service year) of the SSD 24 expires. The SSD writable amount, for example, can be known through the specification provided by a manufacturer of the SSD 24. The written amount is a total amount of data which has been written in the SSD 24 at the corresponding time. For example, the written amount can be acquired from a predetermined area of the SSD 24 or management information of the storage apparatus 1 by a given method.

The remaining usable years is a period (target use period) to be desired for using the SSD 24, and is a period (e.g., years) to be scheduled for the use of the SSD 24. For example, in a case where the currently using SSD 24 needs to be constantly used for 5 years from now on, the remaining usable years become 5.

The SSD operated period is a period during which the SSD 24 is operated (usage record information), and for example, the SSD 24 can acquire the SSD operated period from a predetermined area and a management information of the storage apparatus 1 by a given method.

The unit second is a unit time during which the staging amount is controlled, for example, 10 seconds. In the stabilizing period, the staging controller 13 performs the control of staging every unit second (10 seconds). The unit second can be arbitrarily set by a user, and may be set to 10 seconds or longer or to 10 seconds or shorter. Hereinafter, the example of 10 seconds as the unit second will be described.

The staging controller 13 calculates a threshold of the staging amount by Equation (2) in order to use the current SSD 24 during the remaining usable year from now.

In other words, in the stabilizing period, the staging controller 13 calculates the lowest staging amount (threshold) at which the SSD 24 is used to the end of its life span.

Then, the staging controller 13 controls the SSD controller 14 such that the staging amount is lower than the calculated threshold per unit second (e.g., 10 seconds). Therefore, it is possible to use the current SSD 24 until the full remaining usable years expire.

The staging controller 13 controls the staging performed by the SSD controller 14 in the stabilizing period based on the calculated threshold. Specifically, the staging controller 13 limits the staging amount to be lower than the above-mentioned threshold per unit time (unit second).

Further, in the stabilizing period, the staging controller 13 performs control of absorbing a variation in the staging amount shown by a small wave, and control of absorbing a variation in the staging amount shown by a large wave which is generated unexpectedly based on the above-mentioned threshold.

Specifically, as depicted with a broken line in FIG. 4, the staging amount has a variation which forms a fine wave. Then, referring to the variation in the staging amount, a total sum of staging amounts in the unit second may be lower than the above-mentioned threshold.

When the total sum of the staging amounts in the unit second is lower than the threshold as described above, the staging controller 13 makes an adjustment by increasing the staging amount in the subsequent unit second to cancel the difference.

For example, in a case where the threshold calculated by Equation (2) is 10 MB, when the staging amount performed in a certain 10 seconds as the unit second is 8 MB, the staging controller 13 performs a surplus staging of 2 MB in the subsequent 10 seconds.

In this way, when the staging amount is less than the threshold in a certain unit time, the staging controller 13 writes a different amount between the threshold and the surplus staging amount in the subsequent unit time. In other words, in a case where there is a small writing amount based on the calculated threshold, a carry-over operation is realized in which the carried-over writing is performed later in the subsequent unit time. In addition, a staging amount which is a different amount between the threshold and the staging amount and is carried-over and written later in the subsequent unit time may be referred to as a carry-over amount.

Further, in the stabilizing period, the staging controller 13 predicts a peak value of the day with reference to the short cycle table T2 and the like. For example, a write peak value and a peak value of the hit amount per a predetermined period (e.g., 1 hour) in the SSD 24 in the last 10 days are acquired, and an average value of these values is calculated to predict a peak value of the day.

The staging controller 13 calculates a staging amount (surplus staging amount) which exceeds the threshold calculated by Equation (2) among the predicted peak values (predicted peak values). Then, the staging controller 13 adds a divisional surplus staging amount (keep amount), which is obtained by dividing the surplus staging amount by a predetermined period (e.g., 24 hours), to the threshold of the predetermined period to uniformly reduce the staging amount in 24 hours. The keep amount, for example, can be represented by the following Equation (3).

$$\text{Keep amount} = (\text{Predicted peak value} - \text{Threshold})/(24 \text{ hours} \times 60 \text{ minutes} \times 60 \text{ seconds}/\text{Unit second}) \quad (3)$$

In other words, in the stabilizing period, the staging controller 13 uniformly subtracts (keeps) the keep amount from the staging amount during the predetermined period in preparation for the predicted peak value. Therefore, it is possible to constantly keep the staging amount.

Thus, the staging controller 13 enables that the staging amount in the predetermined period becomes a staging amount lower than the calculated threshold, and the current SSD 24 is used until the full remaining usable years expire.

Further, in a case where a staging request for a staging amount specifically expanded is issued from the cache controller 12, that is, in a case where an unexpectedly wave is generated in the staging amount, the staging controller 13 performs a process of absorbing the unexpected wave caused by the staging request. In other words, the divisional surplus staging amount is subtracted from the threshold in a predetermined period (e.g., 24 hours) from a time point when the unexpected wave is detected in the staging amount, thereby uniformly increasing the staging amount in 24 hours.

In a case where a peak of the staging is generated in the stabilizing period, the staging controller 13 reduces the threshold by the keep amount calculated in advance so as to increase the staging amount in a predetermined period, and to absorb the generated peak of the staging. In other words, it is possible to constantly keep the staging amount.

Therefore, the staging controller 13 enables that the staging amount in the predetermined period becomes a staging amount lower than the calculated threshold, and the current SSD 24 is used until the full remaining usable years expires.

In addition, the detection of the unexpected wave in the staging amount can be performed using various methods. For example, in a case where the staging amount requested from the cache controller 12 exceeds the threshold by a predetermined amount (e.g., 5 times or more), it can be determined that the unexpected wave is generated in the staging amount.

Figure 8:
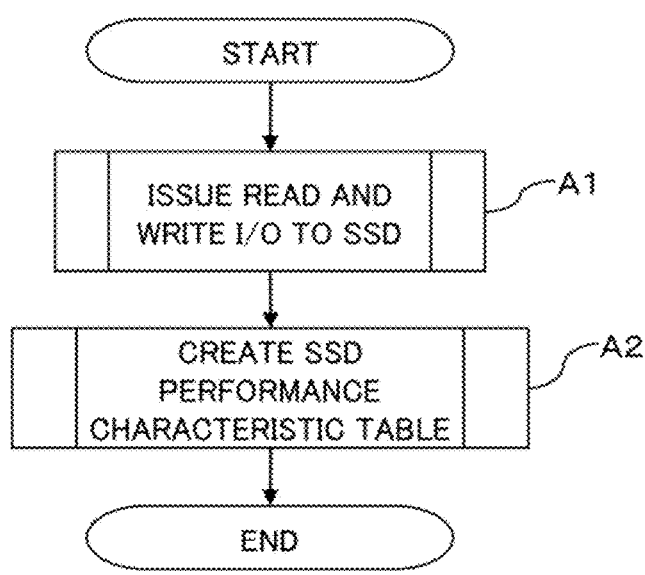
FIG. 8 is a flowchart for describing a process at the time of startup of the storage apparatus according to the embodiment.

A process at the time of startup of the storage apparatus 1 according to the embodiment as configured above will be described according to a flowchart illustrated in FIG. 8 (Steps A1 and A2).

At the time of startup, the staging controller 13 creates the SSD performance characteristic table T1.

In Step A1, while measuring the load condition of the SSD 24, the staging controller 13 issues a plurality of write requests to the SSD 24 until the processing performance is saturated, so that a maximum performance in write is specified.

Further, the staging controller 13 issues the write requests such that the load is divided into a plurality of load ratios to reduce the maximum write performance value in a stepped manner, and issues a plurality of read requests until the read performance at each load ratio is saturated.

In Step A2, the staging controller 13 determines each saturated read amount at every load ratio in write, and creates the SSD performance characteristic table T1.

Next, a process in a case where an I/O request is issued to the SSD 24 of the storage apparatus 1 according to the embodiment will be described according to a flowchart (Steps B1 to B6) illustrated in FIG. 9.

When the I/O request is issued to the SSD 24, the staging controller 13 determines whether the staging (write) is performed in Step B1 according to the I/O request.

In a case where the staging is performed (see YES route in Step B1), the staging controller 13 performs a staging limit process in Step B5. In addition, the staging limit process will be described below using FIG. 10.

Thereafter, in Step B6, it is determined whether the staging is limited. In a case where the staging is not limited (see NO route in Step B6), the short cycle table T2 and the long cycle table T3 are updated based on the I/O request (Steps B2 and B3). Then, in Step B4, the SSD controller 14 performs an I/O process on the SSD 24, that is, a staging process (write process), and ends the process.

On the other hand, in a case where the staging is not performed, that is, in a case where the I/O request is the read request (see NO route in Step B1), the short cycle table T2 and the long cycle table T3 are updated based on the I/O request (Steps B2 and B3). Then, in Step B4, the SSD controller 14 performs the I/O process (read process) on the SSD 24, and ends the process.

Further, in a case where the staging is limited (see YES route in Step B6), the process is ended without handling the staging request. In other words, the process of Steps B2 to B4 is skipped, and the process is ended. In this case, the staging request for data (data having a possibility to be used in the future) to be loaded on the secondary cache does not meet the condition and thus not performed. However, since the data is finally cache-read, there is no problem. Thereafter, in a case where the data is required, the data is read out of the HDD 25.

Figure 10:
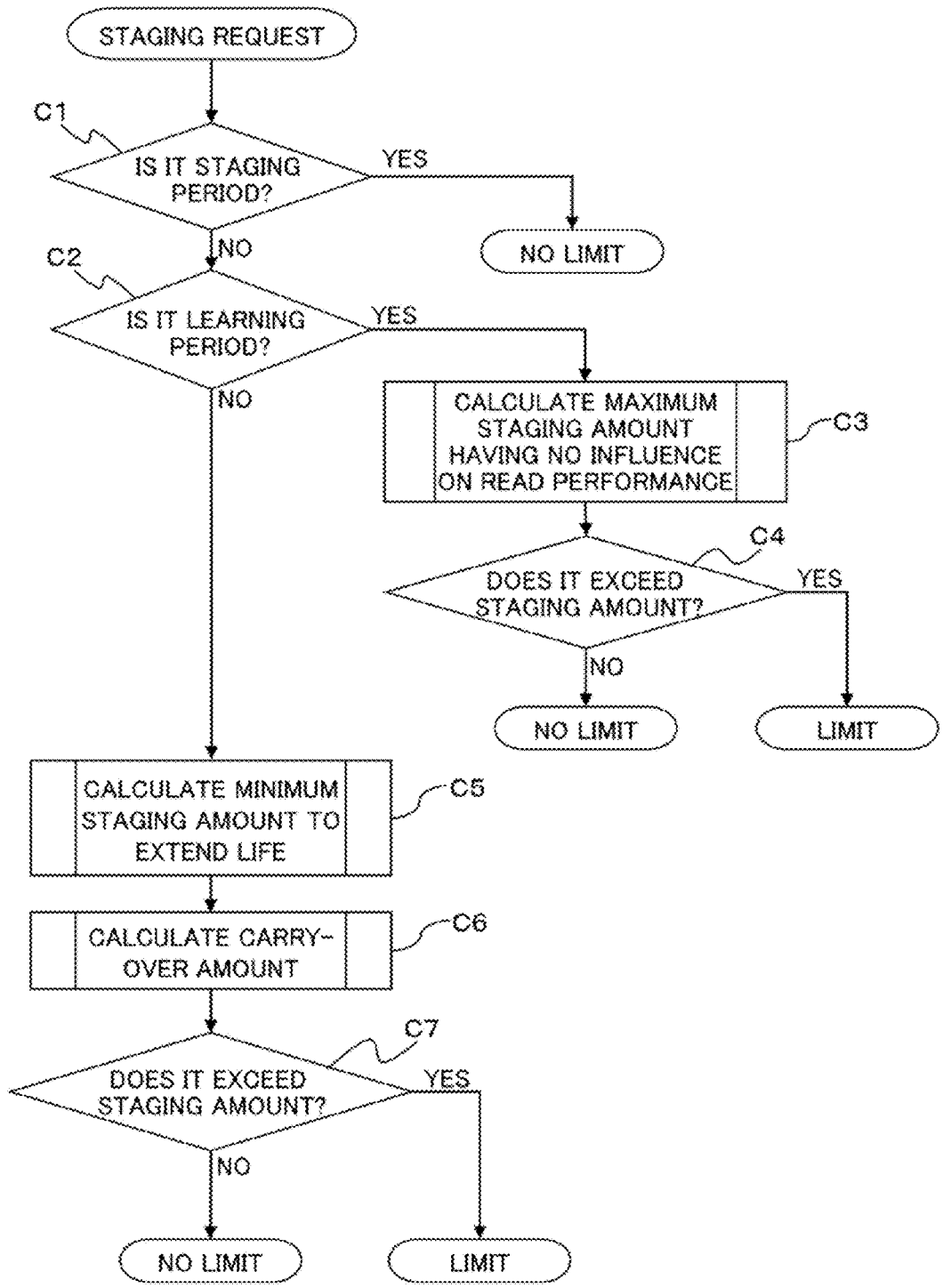
FIG. 10 is a flowchart for describing a staging limit process in the storage apparatus according to the embodiment.

Next, the staging limit process in the storage apparatus 1 according to the embodiment will be described according to a flowchart (Steps C1 to C7) illustrated in FIG. 10.

When receiving the staging request from the cache controller 12, the staging controller 13 determines whether it is the staging period in Step C1. In a case where it is the staging period (see YES route in Step C1), the first staging amount control is performed. In other words, in order to stage all the data read out of the HDD 25 to the SSD 24 without suppressing the staging amount to the SSD 24, the staging controller 13 determines that the staging is performed without limit. Then, the procedure proceeds to Step B6 of the flowchart illustrated in FIG. 9.

Further, in a case where it is not the staging period (see NO route in Step C1), the staging controller 13 then determines whether it is the learning period in Step C2. In a case where it is the learning period (see YES route in Step C2), the second staging amount control is performed. In other words, in Step C3, the staging controller 13 calculates a maximum staging amount having no influence on the read performance.

In Step C4, in a case where the received staging request is performed, the staging controller 13 determines whether a total sum of the staging amounts exceeds the staging amount calculated in Step C3. As a result of determination, in a case where the total sum of the staging amounts exceeds the staging amount calculated in Step C3 (see YES route in Step C4), the staging controller 13 determines that the staging is limited, and the procedure proceeds to Step B6 of the flowchart illustrated in FIG. 9.

Figure 9:
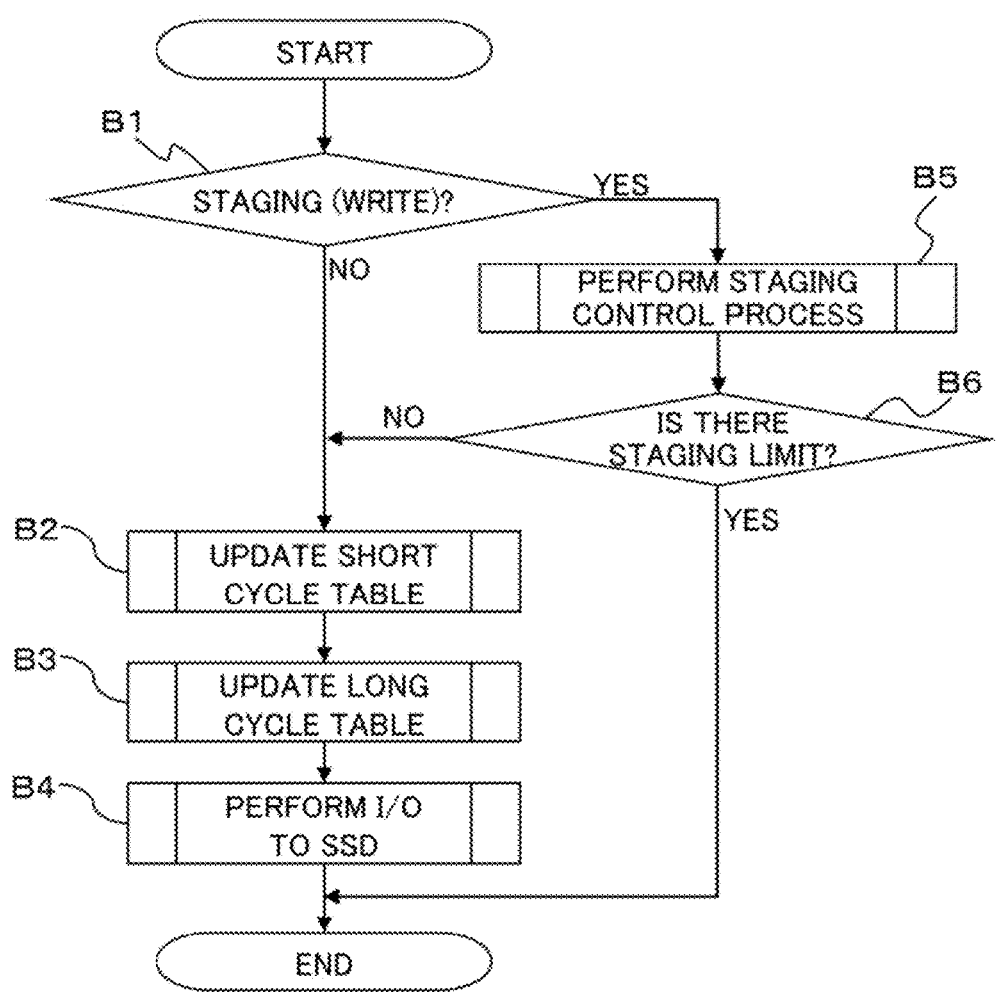
FIG. 9 is a flowchart for describing a process in a case where an I/O request is issued to the SSD in the storage apparatus according to the embodiment.

On the other hand, in a case where the total sum of the staging amounts does not exceed the staging amount calculated in Step C3 (see NO route in Step C4), the staging controller 13 determines that the staging is not limited, and the procedure proceeds to Step B6 of the flowchart illustrated in FIG. 9.

Further, in a case where it is not the learning period (see NO route in Step C2), hereafter the third staging amount control is performed as a process of the stabilizing period. In other words, in Step C5, the staging controller 13 calculates, using Equation (2), the lowest staging amount per unit second at which the SSD 24 is used to the end of its life span.

Then, in Step C6, the staging controller 13 calculates a carry-over amount, and in Step C7, in a case where the received staging request is performed, the staging controller 13 determines whether a total sum of the received staging amount and the carry-over amount exceeds the threshold calculated using Equation (2) in unit time. In other words, it is determined whether the total sum exceeds the staging amount.

As a result of determination, in a case where the total sum exceeds the staging amount (see YES route in Step C7), the staging controller 13 determines that the staging is limited, and the procedure proceeds to Step B6 of the flowchart illustrated in FIG. 9. Further, in a case where the total sum does not exceed the staging amount (see NO route in Step C7), the staging controller 13 determines that the staging is not limited, and the procedure proceeds to Step B6 of the flowchart illustrated in FIG. 9.

As described above, in the storage apparatus 1 according to the embodiment, the use period of the SSD 24 is divided into three periods such as the staging period, the learning period, and the stabilizing period, and the staging control is performed in each period using an optimized method. Therefore, it is possible to efficiently use the SSD 24.

In other words, in the staging period, the first staging amount control is performed in which the staging is performed in priority, so that the SSD 24 can transition to the stabilizing period in a short time.

In the learning period, the staging controller 13 performs the second staging amount control. In other words, the staging controller 13 predicts the hit amount (read amount) based on the short cycle table T2, and further determines a write amount corresponding to the hit amount based on the predicted hit amount with reference to the SSD performance characteristic table T1 described above. Then, the staging is limited by the SSD controller 14 based on the determined write amount.

In other words, in the learning period, the staging controller 13 determines a staging amount at which the SSD 24 can exert its maximum performance without any influence on the read performance, so that the staging control is realized. Therefore, the SSD 24 can be operated by the write amount at which the SSD 24 can exert its maximum performance without hindrance to the read performance of the predicted hit amount (read amount). In other words, it is possible to efficiently operate the SSD 24.

Further, in the learning period, since the data in the SSD 24 changes in a short term, it is possible to predict the hit amount with a high reliability using the short cycle table T2.

In the stabilizing period, the staging controller 13 performs the third staging amount control. In other words, the staging controller 13 calculates, using Equation (2), the lowest staging amount (threshold) per unit second at which the SSD 24 is used to the end of its life span. Then, when the staging amount is less than the threshold, the staging controller 13 performs the carry-over operation in which a different amount between the threshold and the staging amount is staged later in the subsequent unit time. Therefore, the staging amount in a predetermined period becomes lower than the calculated threshold, and the SSD 24 can be used until a full designated period expires (remaining usable years). Therefore, it is possible to efficiently operate the SSD 24.

Further, in the stabilizing period, the staging controller 13 calculates a predicted peak value with reference to the short cycle table T2, and calculates a surplus staging amount which exceeds the calculated threshold using Equation (2). Then, the staging controller 13 adds a divisional surplus staging amount (keep amount) which is obtained by dividing the surplus staging amount in a predetermined period (e.g., 24 hours) to the threshold of the predetermined period to uniformly reduce the staging amount in 24 hours. Therefore, it is possible to constantly keep the staging amount, and the current SSD 24 is used until the full remaining usable years expire.

Further, in a case where a peak of the staging is generated in the stabilizing period, the staging controller 13 reduces the threshold by the keep amount calculated in advance so as to increase the staging amount in a predetermined period, and to absorb the generated peak of the staging. In other words, it is possible to constantly keep the staging amount.

At the time of startup, since the SSD performance characteristic table T1 showing combinations between the read amount and the write amount which are the performance limits of the SSD 24 is created, the staging control can be performed according to the state of the storage apparatus 1. Therefore, the reliability can be improved.

In addition, regardless of the above-mentioned embodiment, various modifications can be made in a scope not departing from the spirit of the embodiment.

Further, through the above-mentioned disclosure, a person skilled in the art can implement and manufacture the embodiment.

According to an embodiment, it is possible to efficiently use a semiconductor storage device.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus which includes a storage device and a semiconductor storage device, comprising:
   a cache controller that controls data input/output of the storage device and causes the semiconductor storage device to function as a cache memory of the storage device; and
   a staging controller that performs, when data is staged from the storage device to the cache memory, first staging amount control during a first period until a staging amount to the cache memory exceeds a first threshold after the storage apparatus starts up; performs second staging amount control during a second period until a variation per unit time of a read amount from the cache memory becomes stable within a predetermined range after the first period; and performs third staging amount control during a third period that starts after the second period.

2. The storage apparatus according to claim 1, wherein the first staging amount control includes control of causing data read out of the storage device to be staged to the cache memory without suppressing the staging amount to the cache memory.

3. The storage apparatus according to claim 1, wherein the second staging amount control includes control of
   predicting a cache hit amount based on process history information of the cache memory and increase tendency of the cache hit amount in the cache memory,
   determining a write load amount corresponding to the predicted cache hit amount with reference to performance characteristic information including a read load of the semiconductor storage device and a write performance in association with each other, and
   causing data to be staged to the cache memory by a staging amount which satisfies the determined write load amount.

4. The storage apparatus according to claim 1, wherein the third staging amount control includes control of
   when a staging amount within unit time is lower than a reference threshold which is calculated based on life performance information and usage record information of the semiconductor storage device in order to use the semiconductor storage device during a target use period,
   adding a staging amount corresponding to a difference between the staging amount and the reference threshold to the staging amount in a subsequent predetermined period.

5. The storage apparatus according to claim 4, wherein the third staging amount control includes control of
   predicting a peak value of the staging amount based on the process history information, and
   equally subtracting a divisional surplus staging amount from the staging amount of the predetermined period, the divisional surplus staging amount being obtained by dividing a surplus staging amount of the predicted peak value over the reference threshold by the predetermined period.

6. A staging control method in a storage apparatus which includes a storage device and a semiconductor storage device, controls data input/output of the storage device, and causes the semiconductor storage device to function as a cache memory of the storage device, the method comprising:
  when data is staged from the storage device to the cache memory,
  performing first staging amount control during a first period until a staging amount to the cache memory exceeds a first threshold after the storage apparatus starts up;
  performing second staging amount control during a second period until a variation per unit time of a read amount from the cache memory becomes stable within a predetermined range after the first period; and
  performing third staging amount control during a third period that starts after the second period.

7. The staging control method according to claim 6, wherein the first staging amount control includes control of causing data read out of the storage device to be staged to the cache memory without suppressing the staging amount to the cache memory.

8. The staging control method according to claim 6, wherein the second staging amount control includes control of
  predicting a cache hit amount based on process history information of the cache memory and increase tendency of the cache hit amount in the cache memory,
  determining a write load amount corresponding to the predicted cache hit amount with reference to performance characteristic information including a read load of the semiconductor storage device and a write performance in association with each other, and
  causing data to be staged to the cache memory by a staging amount which satisfies the determined write load amount.

9. The staging control method according to claim 6, wherein the third staging amount control includes control of
  when a staging amount within unit time is lower than a reference threshold which is calculated based on life performance information and usage record information of the semiconductor storage device in order to use the semiconductor storage device during a target use period,
  adding a staging amount corresponding to a difference between the staging amount and the reference threshold to the staging amount in a subsequent predetermined period.

10. The staging control method according to claim 9, wherein the third staging amount control includes control of
  predicting a peak value of the staging amount based on the process history information, and
  equally subtracting a divisional surplus staging amount from the staging amount of the predetermined period, the divisional surplus staging amount being obtained by dividing a surplus staging amount of the predicted peak value over the reference threshold by the predetermined period.

11. A non-transitory computer-readable recording medium having stored therein a staging control program, wherein
  a storage apparatus includes a storage device and a semiconductor storage device, controls data input/output of the storage device, and causes the semiconductor storage device to function as a cache memory of the storage device, and the program causes a computer to perform
  when data is staged from the storage device to the cache memory,
  performing first staging amount control during a first period until a staging amount to the cache memory exceeds a first threshold after the storage apparatus starts up,
  performing second staging amount control during a second period until a variation per unit time of a read amount from the cache memory becomes stable within a predetermined range after the first period, and
  performing third staging amount control during a third period that starts after the second period.

12. The non-transitory computer-readable recording medium having stored therein the staging control program according to claim 11, wherein the first staging amount control includes control of causing data read out of the storage device to be staged to the cache memory without suppressing the staging amount to the cache memory.

13. The non-transitory computer-readable recording medium having stored therein the staging control program according to claim 11, wherein the second staging amount control includes control of
  predicting a cache hit amount based on process history information of the cache memory and increase tendency of the cache hit amount in the cache memory,
  determining a write load amount corresponding to the predicted cache hit amount with reference to performance characteristic information including a read load of the semiconductor storage device and a write performance in association with each other, and
  causing data to be staged to the cache memory by a staging amount which satisfies the determined write load amount.

14. The non-transitory computer-readable recording medium having stored therein the staging control program according to claim 11, wherein the third staging amount control includes control of
  when a staging amount within unit time is lower than a reference threshold which is calculated based on life performance information and usage record information of the semiconductor storage device in order to use the semiconductor storage device during a target use period
  adding a staging amount corresponding to a difference between the staging amount and the reference threshold to the staging amount in a subsequent predetermined period.

15. The non-transitory computer-readable recording medium having stored therein the staging control program according to claim 14, wherein the third staging amount control includes control of
  predicting a peak value of the staging amount based on the process history information, and
  equally subtracting a divisional surplus staging amount from the staging amount of the predetermined period, the divisional surplus staging amount being obtained by dividing a surplus staging amount of the predicted peak value over the reference threshold by the predetermined period.

* * * * *